United States Patent [19]

Kallina

[11] Patent Number: 5,567,161
[45] Date of Patent: Oct. 22, 1996

[54] METHOD, KIT, AND ARTIFICIAL SEPTUM FOR THE PREPARATION OF A SEPTUM FOR A TAXIDERMY MANIKIN

[76] Inventor: Carl A. Kallina, Box 122, Nada, Tex. 77460

[21] Appl. No.: 344,655

[22] Filed: Nov. 18, 1994

[51] Int. Cl.⁶ .................................................. G09B 23/00
[52] U.S. Cl. ........................................................... 434/295
[58] Field of Search ............................. 434/295, 272, 434/270; 623/10, 16, 66; D24/155; D21/189; 30/314, 124, 125; 47/51

[56] References Cited

U.S. PATENT DOCUMENTS

| | | |
|---|---|---|
| 959,450 | 5/1910 | Bridgeman . |
| 2,634,775 | 7/1947 | Unsinger . |
| 2,757,452 | 8/1956 | Barnes . |
| 4,365,415 | 12/1982 | Pustoch .................................. 30/314 |
| 4,815,900 | 3/1989 | Brickner ................................ 409/132 |
| 5,314,474 | 5/1994 | Helms et al. ............................ 623/16 |

FOREIGN PATENT DOCUMENTS 698142  10/1953  United Kingdom ..................... 30/314

OTHER PUBLICATIONS

Kallina, Instructions For Septum Kit — Published Sep. 1994.

Primary Examiner—Gene Mancene
Assistant Examiner—Jeffrey A. Smith
Attorney, Agent, or Firm—Jonathan E. Grant

[57] ABSTRACT

A method for the preparation of a life-like septum in a taxidermy manikin, using a septum kit comprising an artificial septum and a septum tool, is disclosed.

22 Claims, 2 Drawing Sheets

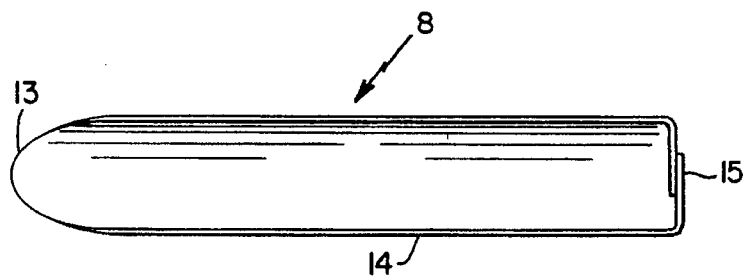
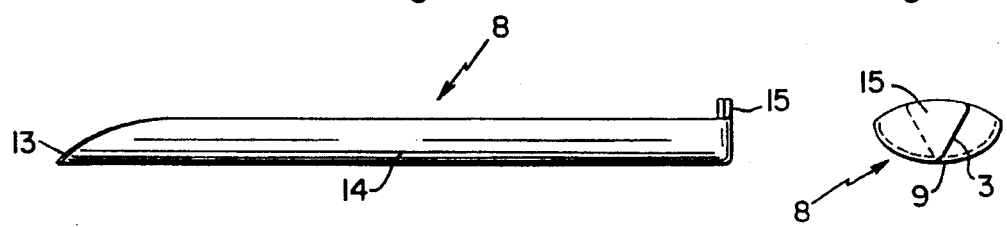
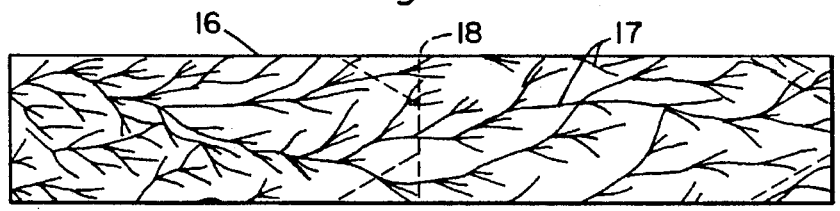
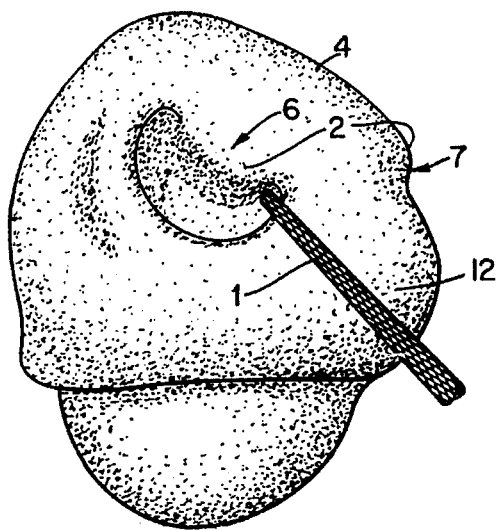
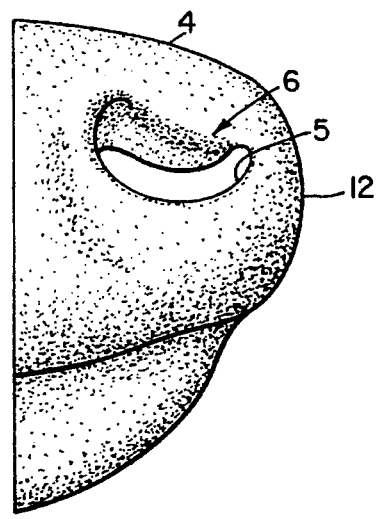

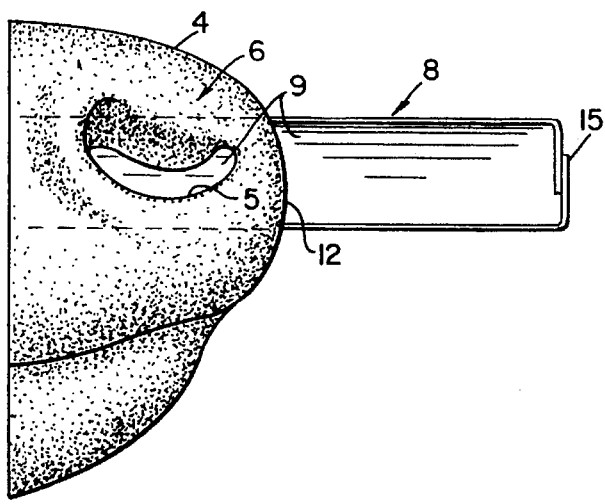
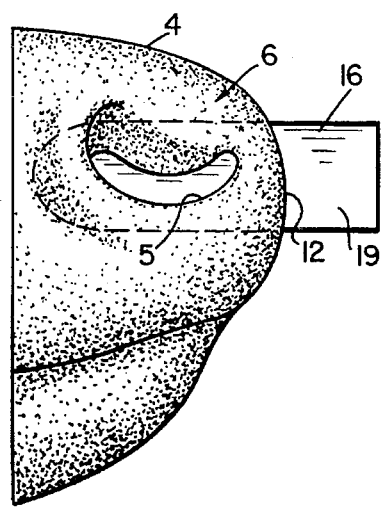
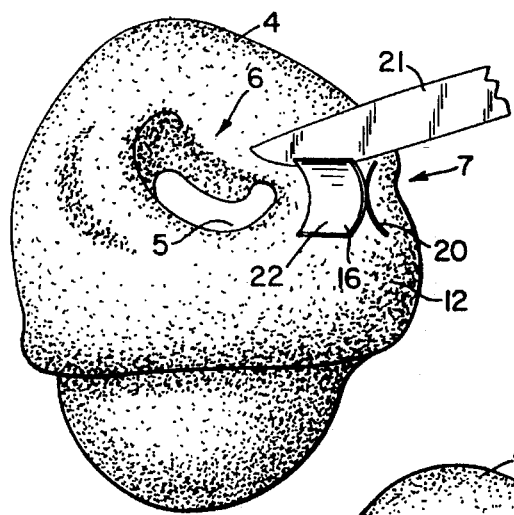
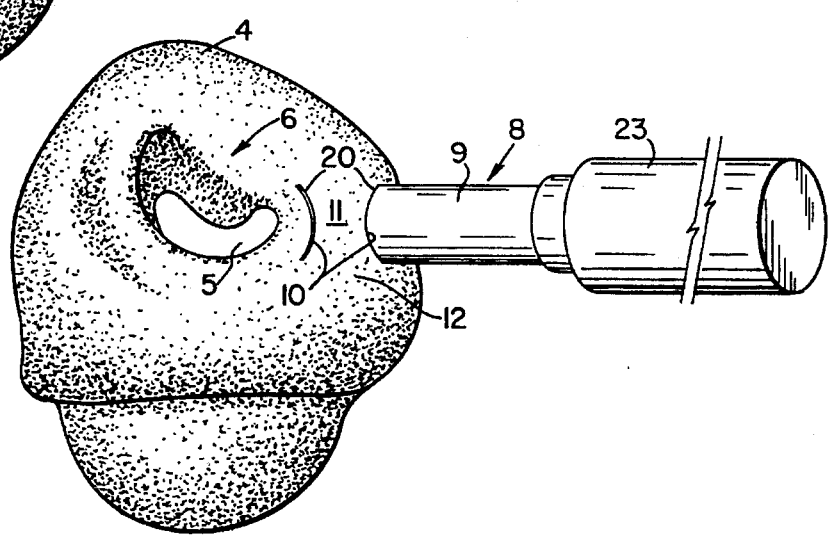

METHOD, KIT, AND ARTIFICIAL SEPTUM FOR THE PREPARATION OF A SEPTUM FOR A TAXIDERMY MANIKIN

BACKGROUND OF THE INVENTION

1. Field of the Invention

The present invention discloses a septum kit and its method of use for the mounting of animals.

2. Description of the Prior Art

Taxidermy consists primarily of the mounting of game birds, fishes and horned animals. In particular, it is most desired, by hobbyists and professionals alike, to mount the heads of horned animals. Competitions are held to choose the most realistic mount; that is, the mount that looks most like the animal appeared when alive.

The origins of modern taxidermy may be seen in the European bison or aurochs mounted over a framework of boards by the Austrian Baron Siegmund von Herberstein, in the great hall of his residence some time before the year 1550. Early crude attempts to fill out skins of animals to lifelike size consisted in merely stuffing the sewed-up skin with hay or straw, or, at a later date, with excelsior. Such specimens might have shown the hair or plumage well, but could only crudely represent lifelike form. There seem to have been critical attempts to improve methods of taxidermy.

In the 19th century, taxidermy was raised to the status of art. Taxidermists experimented more actively with clay and plaster of Paris and with various techniques for making manikins (Encyclopedia Britannica—1962).

A method of transfer of the form of a clay manikin to a light, strong and permanent manikin on which to mount the skin was developed in the late 19th and early 20th century. The animal is manikined in the attitude desired for exhibition, in clay. The clay manikin is sculptured to represent the muscular surface of the animal with attention to the forms of the muscles involved in the particular posture chosen. The clay form is then converted into a plaster of Paris manikin in such a way as to form a three-piece waste manikin. By the application of burlap, composition (originally papier-mache) and, in large animals, a layer of wire cloth to the inside of the manikin, a light, strong, durable copy of the clay manikin was formed (after removal of the manikin), with a surface well adapted to hold the skin of the animal it was to represent.

Today, however, there is an easier and less expensive way to mount an animal. Specifically, the skin of the animal is draped and attached to a urethane form of the animal. This greatly reduces the time and cost involved in the mounting of trophy animals.

Of course, the problem of detailing the animal still exists. Specifically, the skin must be draped and attached properly. However, it is not enough for the skin of the animal to be properly attached. The hooves, ears, eyes, nose of the animal must be made to look as lifelike as possible. The preparation of the nose is particularly difficult. A septum must be created in the urethane manikin so that the mounted animal looks realistic, or as close to lifelike as possible. It is important that there be a reproduction of the cartilage separating the nasal passages.

There exists a number of different methods for preparing the nose section of the urethane manikin, or more specifically, reproducing the cartilage separating the nasal passages.

One method encompasses cutting off the nose of the urethane form and installing a plastic septum. For example, using a urethane whitetail deer form as an example, the two inches of the nose of the manikin is cut off, measured from the tip of the nose. A Foredom or Dremel tool is used to hollow out the nose, removing most of the foam towards the tip and upper muzzle. A plastic septum is installed in the hollowed nose. The nostrils may then be cut to blend with the septum. Enough room is left in the nostrils to allow for skin and glue thickeners. The tip of the nose is reattached.

In another method, a bonded septum is used. A vertical cut of the desired length is made through the center of the nose of the form. The cut is widened using a Bastard file. A hacksaw or any thin blade is used to make a perpendicular cut to the center line and remove one side of the nose. BONDO® is then used to attach both sides of the nose and the nose is pinned back into position. Once the BONDO® hardens, the entire nose is removed, using the same cut used previously to remove one side. A Dremel tool with a one-quarter inch bit is used to shape the inner nostrils. The inside of the nose is manikined using a reference. The BONDO®, which is harder than the urethane, prevents the center of the nose (now a BONDO® septum) from being carved. An epoxy sculpturing compound is used to smooth out the nose, and to epoxy the nose back on to the manikin. The nostril skin is then packed into position, inside the nostril.

These methods have a number of disadvantages. They are time consuming, taking many hours, and require a lot of extra work. Additionally, the nose of the form has to be removed, thus destroying the nose. If the hobbyist makes a mistake, the entire form can be ruined. Additionally, the epoxy and BONDO® glues may give off toxic vapors. The septum that is created is not very lifelike.

In yet another method for creating a septum, some taxidermists make a split in the nose and push the end of the skin in the nostril, simply hiding the details of the nose.

In still yet another method, some taxidermists open the nostrils wider and deeper using a drill or a rasp, and sculpt inside the nostrils with a wax or sculpturing epoxy to simulate the septum. While an improvement over the other methods, a realistic septum is still not achieved.

SUMMARY OF THE INVENTION

The object of the present invention is to provide an improved, fast method of forming a lifelike septum by the use of a septum kit, without having to amputate the nose of the manikin, or use epoxy or BONDO® glues.

The septum kit comprises a septum tool having a semi-pointed rounded, convex edge for insertion into the manikin nose, an elongated, curved convex body portion, and a flattened end perpendicular to the body portion. The septum tool is preferably made out of a single piece of 22 gauge galvanized metal. The septum tool may also be made out of plastic. Because the urethane manikin is easy to puncture, the rounded edge of the septum tool may be only slightly or somewhat pointed, instead of coming to a sharp point. The front edge of the tool may even be somewhat blunt. The tool may come in different sizes, corresponding to the size of the nostrils of the animal being mounted. The two most popular sizes for the septum tool are 4½ inches by 15/16 inches (for whitetail deer), and 6¾ inches by 1¾ inches (for larger game animals). A metal, wooden or plastic handle may be attached to the flattened perpendicular end of the septum tool; however, given the ease with which this tool works, the handle is not necessary.

The septum kit also comprises at least one artificial septum, comprising a flat, rectangular form, being flesh or pink colored on one side, and having vascular markings on the other side. The vascular markings are preferably red, for realism. The artificial septum should be semi-rigid; there should be a degree of flexibility to the septum, but not so much that the artificial septum crumples when it is pushed through the track created by the septum tool. The artificial septum is preferably plastic, although a semi-rigid cardboard material may also be used. The ink, paint or pigment used for the vascular markings are preferably indelible, and impregnated into the plastic. i.e., they should not wash off in water, alcohol, or acetone. Similarly, the side of the artificial septum which is a solid color should also be indelible. It is also preferable that the artificial septum be finely textured on the side that will face outward, specifically the side having a solid color.

The artificial septum should also be translucent, such that when a light is shone on or through the artificial septum, vascular markings facing inward may be seen.

The artificial septums may come in a variety of sizes with the two preferred sizes being about 5¼ inches by about 15/16 inch, and 8 ¾ inches by 1¾ inches. There are preferably 20 artificial septums per septum kit. The artificial septums are cut in half or even in thirds, and may be used to mount 20–30 moose, sheep, elk, or other animals.

A description of how to use or make the septum kit follows.

BRIEF DESCRIPTION OF THE DRAWINGS

The above and other objects, features and advantages of the present invention will become more readily apparent from the following description, reference being made to the accompanying drawings in which:

FIG. 1a is an overhead view of the septum tool;

FIG. 1b is a side view of the septum tool;

FIG. 1c is a rear view of the septum tool;

FIG. 2 is a frontal view of the artificial septum;

FIG. 3 is a frontal side view of a nose of a manikin;

FIG. 4 is a side view of the nose of a manikin after the septum wall has been drilled;

FIG. 5 is a frontal side view of the septum tool inserted in the nose of the manikin;

FIG. 6 is a frontal side view of the artificial septum being inserted into the C cut made in the nose of the manikin;

FIG. 7 is a frontal side view of the artificial septum being trimmed; and

FIG. 8 is a frontal side view of the other cut being made by the septum tool on the other side of the nose.

DESCRIPTION OF THE PREFERRED EMBODIMENT

Prior to using the septum kit, it is preferable that the nostrils through the plastic manikin be drilled out. As shown in FIGS. 3–4, a detail rasp 1 may be used to work behind the wing area 2 of the nose 4 of the manikin. For simplicity, a hole 5 may be drilled through one nostril 6 and out the other nostril 7. The area around the nostril may be cleaned using any appropriate tool, such that there is no loose urethane foam.

The septum tool 8 shown in FIGS. 1, 3, and 6 is used to prepare the septum track. These Figures show the septum tool comprising a semi-pointed rounded, convex edge 13 for insertion into the manikin, an elongated, curved convex body portion 14, and a flattened end 15 perpendicular to the length of said body portion. A handle 23 may be attached to the flattened end 15 of the tool 8.

The convex part 9 of the tool 8 should be off-center from the nostril 6, with the convex part 9 of the tool 8 facing the center 11 of the nose of the manikin. More specifically, the tool should be positioned in front of the nostril opening 6 near the tip 12 of the nose, with the curvature behind and facing the open nostril. By rocking and pressing the tool on the nose pad area, it will cut into the tougher outer skin of the form. Once through, use your thumb to push the speed septum tool straight back into the form, thus creating a "septum track." With tool installed, one can now "read" where the septum will lay. If the location is not satisfactory, the septum tool may be pulled out and reinstailed so that another track is cut. The tool should be pushed straight back, passing behind the nostril opening 6, with the curvature behind and facing the open nostril 6.

Imperfections can be cleaned up by rubbing a blunt or sharp object around the nostril opening. The septum tool can be removed before or after the imperfections are cleaned up.

The next step is to install the artificial septum shown in FIGS. 2, 6, and 7. The artificial septum 16 comprises a flat, rectangular sheet, a material selected from the group consisting of plastic and cardboard, with plastic being the preferred material. The septum has two sides, with one side having vascular markings 17, and the other side having a solid color mimicking the natural colors of a septum in a mammalian species.

The septum is cut in half (as indicated by the dotted lines 18) or cut to size along the dotted lines 18 to fit into the slot cut by the septum tool 8. The artificial septum is curled with the "veins" facing inward and the flesh or pink colored side 19 facing the outside or nostril opening. If the septum seems stiff and difficult to curl, it may be warmed up to improve its flexibility. The artificial septum 16 is inserted into the "C" shaped tracks 20 cut by the septum tool.

Some of the artificial septum will be sticking out through the C shaped track at the tip of the nose, as shown in FIG. 7. A scalpel 21 is used to trim off the excess septum 22 sticking out from the track so that the artificial septum is flush with the nose pad. The nose pad may be smoothed over with clay or a little hot glue. There should not be any septum edge protruding above the nose pad.

The above steps are repeated with the other nostril. The "C" shaped tracks are cut back to back 10 as shown in FIG. 8. The animal may be mounted as usual. The inner nose end skin is cut smooth and adjusted so that it runs up to or slightly overlaps the septum. This will make for an even skin to septum transition. The skin is pulled down and around the "wing area" using forceps or tweezers. The nostrils are packed tightly with cellophane, particularly behind the wing area. The cellophane not only holds the skin down but also presses it thin. The cellophane is removed after an hour or so to check for any needed adjustments. It is then repacked for drying. It is advisable to use hide paste for the skin.

The septum tool and the artificial septum may be manufactured by conventional means. The curved septum tool may be made by taking a rectangular piece of 22 gauge galvanized metal, cutting a curved, semi-pointed edge at the "front" of the rectangular metal, and making a "v" cut 3 at the rear of the rectangular metal piece. The metal may be laid into a jig. A rod is placed on top of the metal in the jig, and hammered down, thus forming a curved tool. The rear edges may be folded together, to form a back section where the user may place his fingers or thumbs to push the tool through the urethane manikin. The tool can be easily mass produced.

Similarly, the artificial septum can be made by conventional mass production methods which allow for the solid coloring and texturing on one side of the artificial septum and the formation of vascular markings on the other side. Vascular markings may be applied by silk screen using indelible inks or paints, etching processes, or by any other suitable means.

The entire procedure for the preparation of the septum should take less than ten minutes, Whereas the old procedures would take up to an hour.

Although the present invention has been herein shown and described in considerable detail in what is believed to be the most practical and preferred embodiment thereof, it is to be understood that many variations thereof are possible and the present invention is not to be limited to such details, but is to be accorded the full scope of the appended claims.

What is claimed is:

1. A septum kit for the preparation of taxidermy manikins, comprising:
   a septum tool, comprising a semi-pointed rounded, convex edge for insertion into a taxidermy manikin said septum tool being of a size proportionate to allow for manikining a nostril in said taxidermy manikin; and
   at least one artificial septum for use in taxidermy manikins, comprising a flat, rectangular sheet, said sheet comprised of a material selected from the group consisting of plastic and cardboard, said sheet having two sides, one said side having vascular markings, and the other said side having a solid color mimicking the natural colors of a septum in a mammalian species.

2. The septum kit according to claim 1, wherein said septum tool is comprised of a material selected from the group consisting of metal and plastic.

3. The septum kit according to claim 2, wherein said septum tool is comprised of a single sheet of 22 gauge galvanized metal.

4. The septum kit according to claim 1, wherein the size of said septum tool is selected from the group consisting of about 4½ inches by about 15/16 inches, and ¾ inches by about 1¾ inches.

5. The septum kit according to claim 1, wherein said septum tool further comprises a flattened end perpendicular to the length of said body portion.

6. The septum kit according to claim 1, wherein said septum tool further comprises an elongated, curved convex body portion, and a flattened end perpendicular to the length of said body portion.

7. The septum kit according to claim 6 wherein said septum tool further comprises a handle attached to the flattened edge of said tool.

8. The septum kit according to claim 1, wherein said sheet of said artificial septum is semi-rigid.

9. The septum kit according to claim 1, wherein said sheet of said artificial septum is comprised of a material selected from the group consisting of plastic and cardboard.

10. The septum kit according to claim 1, wherein said sheet of said artificial septum is comprised of said plastic, and colors used to make said vascular markings on said sheet of said artificial septum are impregnated into the plastic.

11. The septum kit according to claim 1, wherein at least one said side of said sheet of said artificial septum is textured.

12. The septum kit according to claim 1, wherein said sheet of said artificial septum is translucent.

13. The septum kit according to claim 1, wherein said vascular markings on said sheet of said artificial septum are red in color.

14. An artificial septum for use in taxidermy manikins, comprising a semi-rigid flat, rectangular sheet, said sheet comprised of a material selected from the group consisting of plastic and cardboard, said sheet having two sides, wherein one said side has vascular markings, and the other side is of a solid color mimicking the natural colors of a septum in a mammalian species.

15. The artificial septum according to claim 14, wherein said vascular markings on said sheet of said artificial septum are red in color.

16. The artificial septum according to claim 14, wherein said sheet of said artificial septum is made of plastic, and vascular markings of said sheet of said artificial septum are impregnated into the plastic and are indelible.

17. The artificial septum according to claim 14, wherein said sheet of the artificial septum is finely textured on at least one side of said sheet of said artificial septum.

18. The artificial septum according to claim 14, wherein said sheet of said artificial septum is translucent.

19. A method for the preparation of a septum for a taxidermy manikin, comprising the steps of:
   drilling out the nostrils through a nose of the taxidermy manikin;
   placing a septum tool off center from the tip of and in front of the nose of the manikin, said septum tool comprising a semi-pointed rounded, convex edge for insertion into said manikin;
   pushing said septum tool straight back, wherein said septum tool passes behind the nostril opening, with the curvature of said tool behind and facing the open nostril, therein forming a C cut behind and facing the open nostril;
   feeding an artificial septum for use in taxidermy manikins through the C cut formed by the septum tool, said artificial septum comprising a flat, rectangular sheet, said sheet comprised of a material selected from the group consisting of plastic and cardboard, said sheet having two sides, one said side having vascular markings, and the other said side having a solid color mimicking the natural colors of a septum in a mammalian species; and
   repeating the process with the other nostril of the manikin.

20. The method according to claim 19, further comprising removing imperfections around the nostril opening after drilling.

21. The method according to claim 19, wherein the artificial septum is cut in half or to size to fit into the C groove cut by the septum tool, and that the vascular markings of the artificial septum are facing the inside of the nostril and the other side comprising the solid color is facing the opening of the nostril.

22. The method according to claim 19, further comprising trimming off any excess artificial septum sticking out from the C cut at the front of the nose.

\* \* \* \* \*